J. B. GILLESPIE.
STRAIGHT LINE KNIFE.
APPLICATION FILED OCT. 10, 1919.
1,379,973. Patented May 31, 1921.
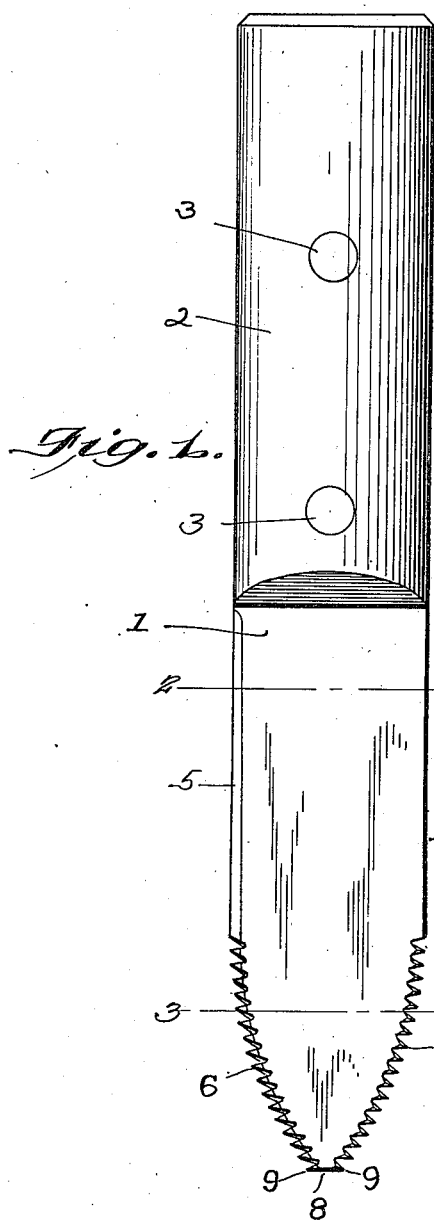
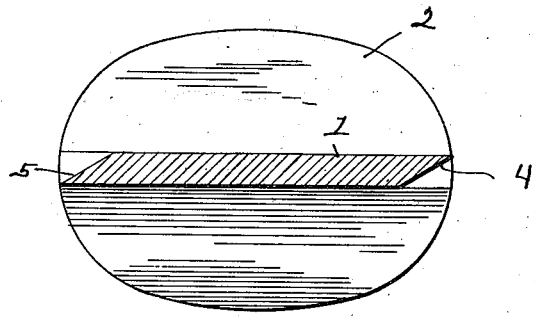
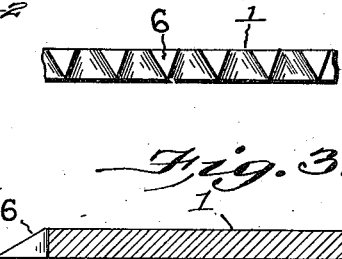
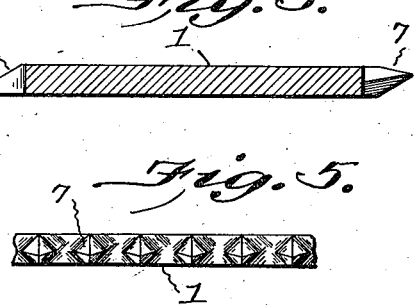
Inventor
J. B. Gillespie
By Edwin S. Clarkson
his Attorney

UNITED STATES PATENT OFFICE.

JOHN B. GILLESPIE, OF HOQUIAM, WASHINGTON.

STRAIGHT-LINE KNIFE.

1,379,973.  Specification of Letters Patent.  Patented May 31, 1921.

Application filed October 10, 1919. Serial No. 329,662.

*To all whom it may concern:*

Be it known that I, JOHN B. GILLESPIE, a citizen of the United States, residing at Hoquiam in the county of Grays Harbor and State of Washington, have invented certain new and useful Improvements in Straight-Line Knives, of which the following is a specification.

One of the objects of my invention is to produce a knife of such construction that it will not be deflected from its course along the edge of a square by checks in the wood, or by the grain of the wood, and one which will make a well defined line in rough timber. A further object of my invention is to adapt my improved straight line knife for use in connection with metal and other materials; and with these and other objects in view my invention consists of the parts and combination of parts as will be hereinafter set forth.

In the drawings—

Figure 1 is a side elevation of a straight line knife embodying my invention.

Fig. 2 is a transverse sectional view on the line 2—2 Fig. 1.

Fig. 3 is a transverse sectional view on the line 3—3 Fig. 1.

Fig. 4 is an enlarged detail plan view of the teeth on one side of the knife.

Fig. 5 is an enlarged detail plan view of the teeth on the other side of the knife.

The reference numeral 1 designates the blade of the knife, which may be made of any size or desired width, to which is secured the handle 2 by means of suitable rivets or the like 3.

The blade 1 is provided on its opposite edges with oppositely disposed knife edges 4 and 5, whereby the knife may be used either as a right or a left hand tool. These knife edges extend from the handle 2 for a considerable distance, as shown in the drawing, and are merged into saw like teeth 6 and 7, that portion of the blade having the saw like teeth being gradually tapered toward its end where the blade terminates in a blunt or flat portion 8 having a saw tooth 9 at each end to facilitate the holding of the knife in line until the end of the proposed mark is reached.

The teeth 6 are of the usual saw tooth construction or configuration, while the teeth 7 are nearer the shape of a pyramid as shown clearly in Fig. 5.

The knife edge enables one to make a very thin guide line along the edge of a square while the saw like teeth enables one to make a deep guide line in heavy or rough timber along the square edge. The combined action of the knife edges and the teeth prevent the knife from being deflected from the edge of the square by checks, splits or the grain in the lumber being marked, thus insuring a true straight line along the edge of the square.

What I claim is:

A straight line knife comprising a flat blade tapered at one end, saw teeth on one edge of the tapered end, all beveled in the same direction, each tooth having a flat face in the plane of one face of the blade, and pyramidical saw teeth on the opposite edge of the tapered end in alinement with each other and disposed in a direction opposite to the bevel of the first named teeth.

In testimony whereof I affix my signature.

JOHN B. GILLESPIE.